United States Patent
Matsuzawa et al.

(10) Patent No.: US 8,724,946 B2
(45) Date of Patent: May 13, 2014

(54) OPTICAL FIBER TAPE CORE WIRE MANUFACTURING METHOD, MANUFACTURING DEVICE, AND OPTICAL FIBER TAPE CORE WIRE AND OPTICAL FIBER CABLE MANUFACTURED WITH SAID MANUFACTURING METHOD

(71) Applicants: Takashi Matsuzawa, Sakura (JP); Yukiko Take, Sakura (JP); Mizuki Isaji, Chiba (JP); Ken Osato, Sakura (JP); Naoki Okada, Yotsukaido (JP)

(72) Inventors: Takashi Matsuzawa, Sakura (JP); Yukiko Take, Sakura (JP); Mizuki Isaji, Chiba (JP); Ken Osato, Sakura (JP); Naoki Okada, Yotsukaido (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/973,445

(22) Filed: Aug. 22, 2013

(65) Prior Publication Data

US 2013/0343712 A1    Dec. 26, 2013

Related U.S. Application Data

(63) Continuation of application No. PCT/JP2012/054121, filed on Feb. 21, 2012.

(30) Foreign Application Priority Data

Feb. 23, 2011 (JP) .................... 2011-036866

(51) Int. Cl.
G02B 6/44 (2006.01)

(52) U.S. Cl.
CPC .............. *G02B 6/443* (2013.01); *G02B 6/4432* (2013.01); *G02B 6/4495* (2013.01); *G02B 6/4479* (2013.01)
USPC ............................ 385/102; 385/100; 385/114

(58) Field of Classification Search
CPC .... G02B 6/443; G02B 6/4432; G02B 6/4495; G02B 6/4479; G02B 6/4482; G02B 6/4403
USPC ......................................... 385/100, 102, 114
See application file for complete search history.

(56) References Cited

U.S. PATENT DOCUMENTS 5,975,404 A * 11/1999 Ziemek et al. ............... 228/17.5
6,621,966 B2 * 9/2003 Lail ............................... 385/114
6,661,956 B2 * 12/2003 Yamasaki et al. ............ 385/109

(Continued)

FOREIGN PATENT DOCUMENTS

JP    05-232362 A    9/1993
JP    09-043465 A    2/1997

(Continued)

OTHER PUBLICATIONS

International Search Report of PCT/JP2012/054121, dated Apr. 17, 2012.

*Primary Examiner* — Ellen Kim
(74) *Attorney, Agent, or Firm* — Sughrue Mion, PLLC

(57) ABSTRACT

Provided is an method of manufacturing an optical fiber tape core wire with which, even when the optical fiber tape core wire is separated into optical fiber wires, it can be determined which optical fiber tape core wire each optical fiber wire is associated with. A fiber running length adjustment device 13 adjusting the running lengths of the optical fiber wires 2 running from printers 8 (8A to 8D) to a tape forming device 11 is used to adjust the running lengths of all the optical fiber wires 2 between the printers 8 and the tape forming device 11 to a same length. By this adjustment, markings 6 formed on each optical fiber wire 2 (2A to 2D) can be aligned with the corresponding markings 6 formed on the other fiber wires 2 to the same position.

6 Claims, 8 Drawing Sheets

(56) References Cited

U.S. PATENT DOCUMENTS

2010/0322572 A1\* 12/2010 Sakabe et al. ............... 385/100
2013/0028563 A1\* 1/2013 Matsuzawa et al. .......... 385/120

FOREIGN PATENT DOCUMENTS

| JP | 2007-178883 A | 7/2007 |
| JP | 2011-221083 A | 11/2011 |

\* cited by examiner

FIG. 3
(A)
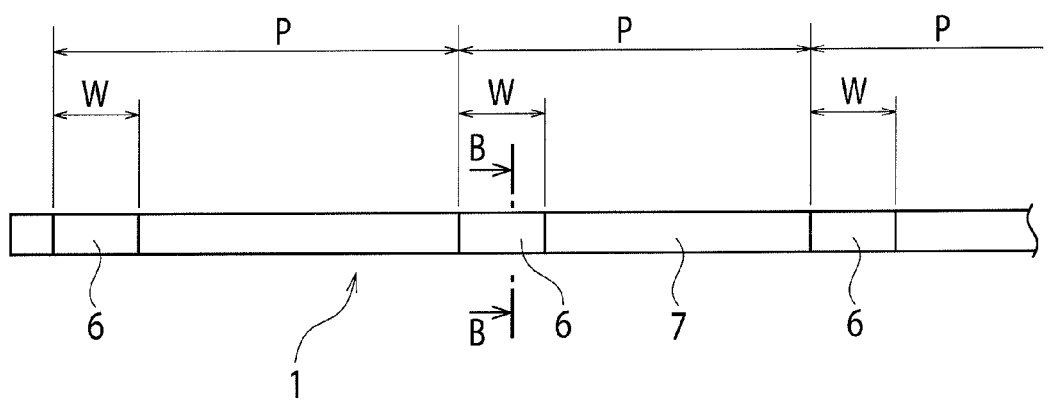
(B)
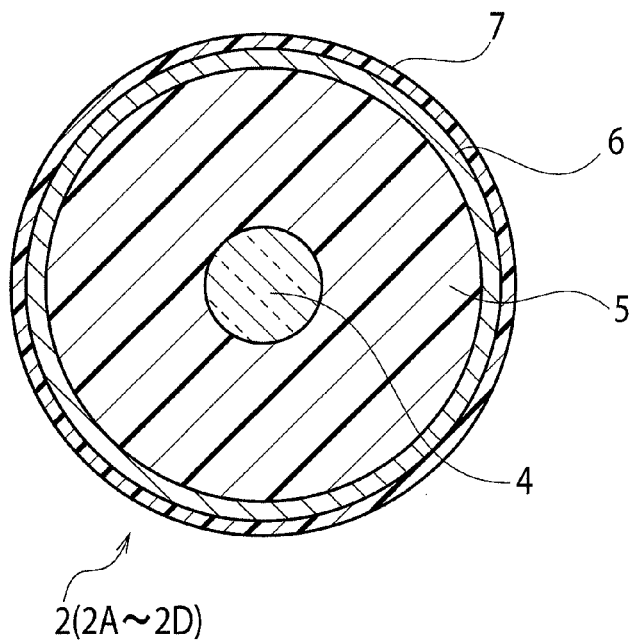

OPTICAL FIBER TAPE CORE WIRE MANUFACTURING METHOD, MANUFACTURING DEVICE, AND OPTICAL FIBER TAPE CORE WIRE AND OPTICAL FIBER CABLE MANUFACTURED WITH SAID MANUFACTURING METHOD

CROSS-REFERENCE TO RELATED APPLICATIONS

The application is a Continuation of PCT Application No. PCT/JP2012/054121, filed on Feb. 21, 2012, and claims the benefit of priority from the prior Japanese Patent Application No. 2011-036866, filed on Feb. 23, 2011, the entire contents of which are incorporated herein by reference.

BACKGROUND OF THE INVENTION

The present invention relates to a method of manufacturing an optical fiber tape core wire, a manufacturing device of the same, and an optical fiber tape core wire and an optical fiber cable manufactured by the method.

For example, Japanese Patent Laid-open Publication No. 2007-178883 (PTL1) discloses an optical fiber tape core wire including four sub-unit tapes which are arranged side by side and are integrated with tape resin. Each sub-unit tape includes four optical fiber wires which are arranged side by side and are integrally coated with tape resin. Markings are printed on the surface of the integrating tape resin for identifying each sub-unit tape.

The markings include identification patterns (for example, dot marks) which can identify each sub-unit tape when the optical fiber tape core wire is separated into the sub-unit tapes. For example, the first sub-unit tape has a print of a one-dot mark, the second sub-unit tape has a print of two-dot mark, the third sub-unit mark has a print of a three-dot mark, and the fourth sub-unit mark has a print of a four-dot mark.

When the optical fiber tape core wire with such a print is separated into the individual sub-unit tapes, a sub-unit tape including the one-dot mark can be visually identified as the first sub-unit tape.

However, in the optical fiber tape core wire of PTL 1, the markings are printed on the surface of the tape resin with which the four sub-unit tapes are integrated. If each separated sub-unit tape is further separated into individual optical fiber wires, the dot marks used as the identifiers of the sub-units are therefore removed. Accordingly, it is not known which sub-unit tape each separated optical fiber wire is associated with. In order to solve the above problem, it is possible to print marks on the optical fiber wires themselves. However, this requires two printing steps and complicates the manufacturing process.

Accordingly, an object of the present invention is to provide a method of manufacturing an optical fiber tape core wire with which, even when the optical fiber tape core wire is separated into optical fiber wires, it can be determined using markings formed by one time print which optical fiber tape core wire each of the optical fiber wires is associated with and the positions of the printed markings can be aligned, a manufacturing device of the same, and an optical fiber tape core wire and an optical fiber cable manufactured by the above method.

SUMMARY

An invention according to claim 1 has a feature of including: a printing step of causing a plurality of optical fiber wires to run, each optical fiber wire including a resin coating layer of resin coating a silica glass fiber, and using a printer provided in a middle of a path of running, to print a marking for identifying the optical fiber tape core wire on a part of each of the plurality of optical fiber wires in the longitudinal direction; a colored layer formation step of using a coloring device provided in downstream of the printer in a fiber running direction to form translucent colored layers of different colors on the respective optical fiber wires with the markings printed in the printing step; a colored layer curing step of using a colored layer curing device provided in downstream of the coloring device in the fiber running direction to cure the colored layer; a tape forming layer formation step of using a tape forming device provided in downstream of the colored layer curing device in the fiber running direction to coat the plurality of optical fiber wires with colorless transparent resin collectively into a tape and form a tape forming layer; a tape forming layer curing step of using a tape forming layer curing device provided in downstream of the tape forming device in the fiber running direction to cure the tape forming layer; and a fiber running length adjustment step of using fiber running length adjustment devices adjusting the running lengths of the plurality of optical fiber wires running from the respective printers to the tape forming device to adjust the running lengths of all the optical fiber wires between the respective printers and tape forming device to a same length.

An invention according to claim 2 is the method of manufacturing an optical fiber tape core wire according to claim 1, the method further including: a fiber running length correction step of measuring the position of the marking printed on each optical fiber wire in just upstream or downstream of the tape forming device, calculating a relative positional shift amount of the measured position of each marking, and based on the relative positional shift amounts, operating the fiber running length adjustment devices to adjust the running lengths of all the optical fiber wires between the respective printers and the tape forming device to a same length.

An invention according to claim 3 has a feature of including: a printer which causes a plurality of optical fiber wires to run, each optical fiber wire including a resin coating layer of resin coating a silica glass fiber, to print a marking for identifying an optical fiber tape core wire on a part of each of the plurality of optical fiber wires in the longitudinal direction in a middle of a path of running; a coloring device which forms translucent colored layers of different colors on the respective optical fiber wires with the markings printed; a colored layer curing device which cures the colored layer; a tape forming device which coats the plurality of optical fiber wires with colorless transparent resin all collectively a tape to form a tape forming layer; a tape forming layer curing device which cures the tape forming layer; and fiber running length adjustment devices which adjust the running lengths of the plurality of optical fiber wires running from the respective printers to the tape forming device to a same length.

An invention according to claim 4 is the manufacturing device for an optical fiber tape core wire according to claim 3, further including: a marking position measuring device which measures the position of the marking printed on each optical fiber wire in just upstream or downstream of the tape forming device; and a controller which calculates a relative positional shift amount of the measured position of each marking, and based on the relative positional shift amounts, operates the fiber running length adjustment devices to adjust the running lengths of all the optical fiber wires between the respective printers and the tape forming device to a same length.

An invention according to claim 5 is an optical fiber tape core wire manufactured by the manufacturing method according to claim 1 or 2.

An invention according to claim 6 is an optical fiber cable, including a plurality of the optical fiber tape core wires according to claim 5 accommodated in the cable.

According to the present invention, if in the fiber running adjustment step, the fiber running length adjustment devices, that adjust the running lengths of the optical fiber wires running from the respective printers to the tape forming device, are used to adjust the running lengths of all the optical fiber wires between the respective printers and the tape forming device to a same length, the positions of the markings printed on all the optical fiber wires can be aligned with one another to the same positions in the longitudinal direction of the optical fiber wires at the position in just upstream of the tape forming device. When the optical fiber wires are then formed into a tape in the tape forming layer formation step, it is possible to manufacture an optical fiber tape core wire in which the positions of the markings of all the optical fiber wires are aligned. Accordingly, even if the optical fiber tape core wire is separated into optical fiber wires, it can be easily recognized which optical fiber tape core each of the separated optical fiber wire is associated with by seeing the type of the marking thereof.

BRIEF DESCRIPTION OF DRAWINGS

FIG. 3 illustrates an optical fiber wire constituting the optical fiber tape core wire of FIG. 2, FIG. 3(A) being a plan view thereof, FIG. 3(B) being an enlarged cross-sectional view thereof taken along a line B-B.

DESCRIPTION OF EMBODIMENTS

Hereinafter, with reference to the drawings, a description is given of a specific embodiment to which the present invention is applied.

<Description of Structure of Optical Fiber Tape Core Wire Manufactured by Method of the Invention>

Figure 1:
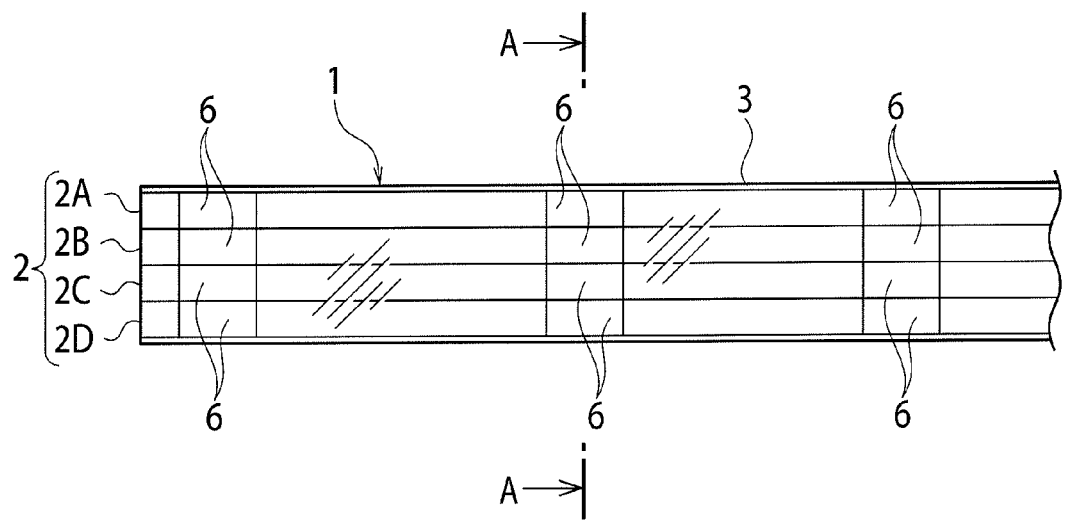
FIG. 1 is a plan view of an optical fiber tape core wire of an embodiment.
Figure 2:
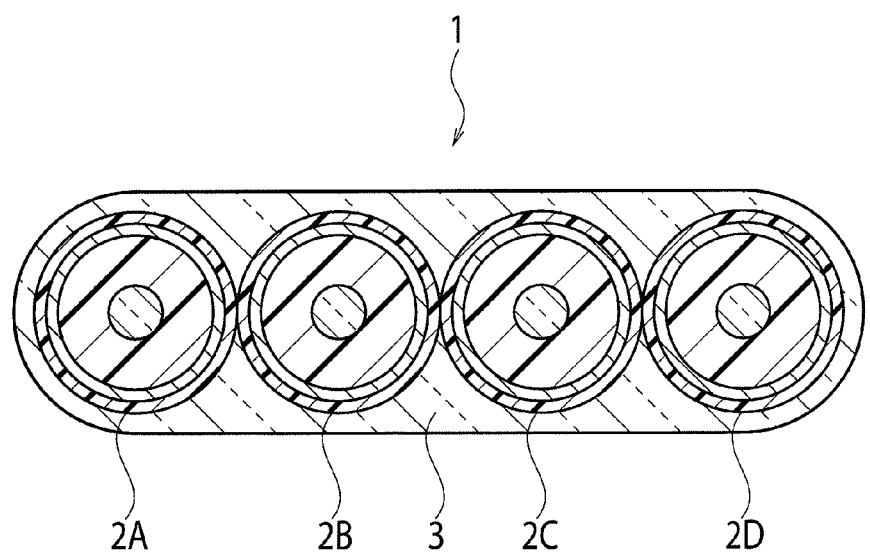
FIG. 2 is an enlarged cross-sectional view of the optical fiber tape core wire of FIG. 1 taken along a line A-A.
Figure 4:
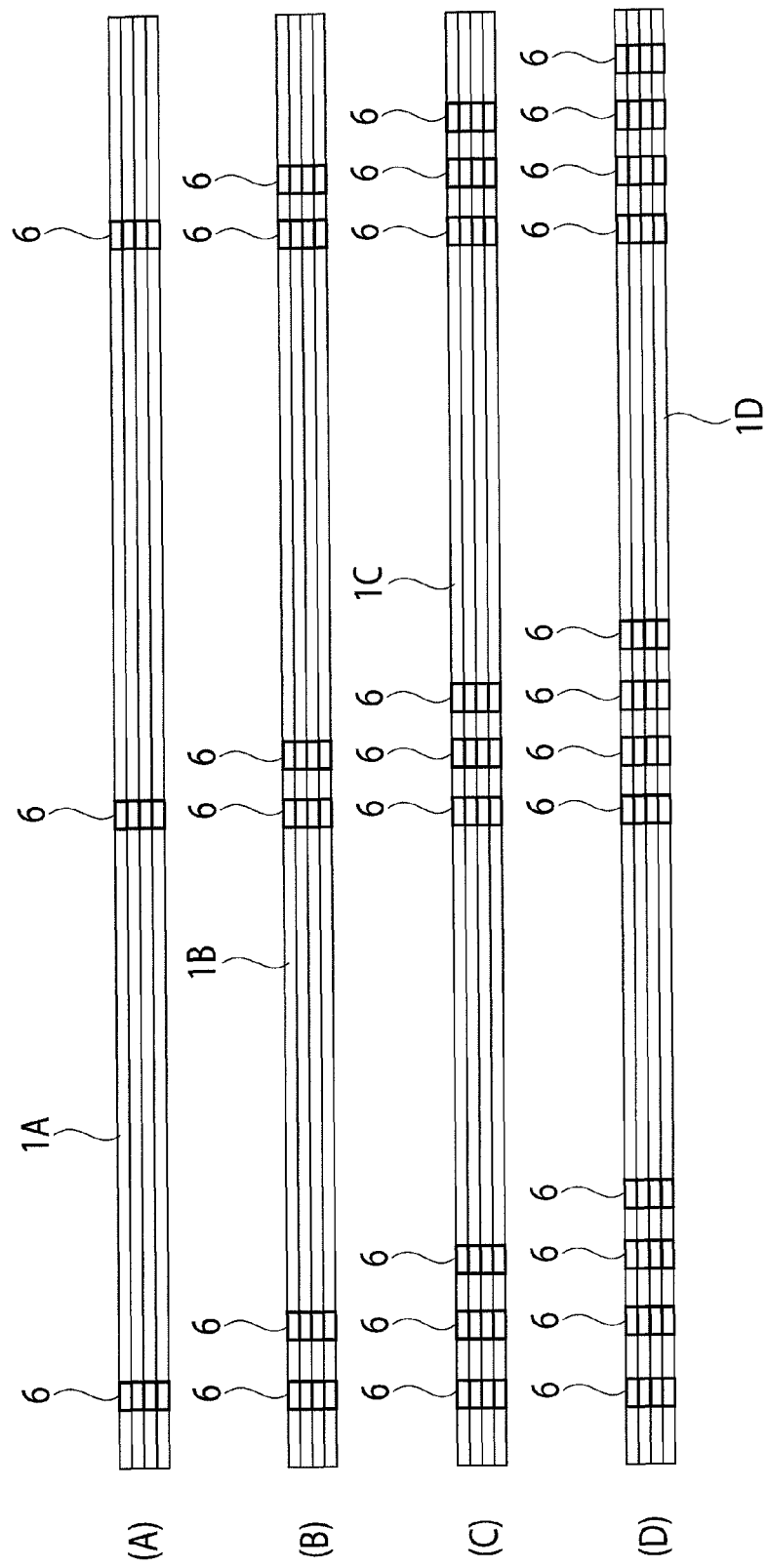
FIG. 4 is plan views of the optical fiber tape core wire of the embodiment, FIGS. 4(A) to 4(D) being an examples with one, two, three, and four markings repeatedly printed at a predetermined pitch, respectively.

First, a description is given of an optical fiber tape core wire manufactured with a manufacturing method to which the present invention is applied. FIG. 1 is a plan view of an optical fiber tape core wire. FIG. 2 is an enlarged cross-sectional view of the optical fiber tape core wire of FIG. 1 taken along a line A-A. FIG. 3 illustrates an optical fiber constituting the optical fiber tape core wire of FIG. 2, FIG. 3(A) being a plan view thereof, FIG. 3(B) being an enlarged cross-sectional view thereof taken along a line B-B of FIG. 3(A). FIG. 4 is plan views of the optical fiber tape core wire of the embodiment, FIGS. 4(A) to 4(D) illustrating examples with one, two, three, and four markings repeatedly printed at a predetermined pitch, respectively.

As illustrated in FIGS. 1 and 2, an optical fiber tape core wire 1 includes: a plurality of optical fiber wires 2 (2A to 2D) which are arranged side by side in parallel and are in contact with each other; and a tape forming layer 3 of colorless transparent resin collectively coating the optical fiber wires 2 into a tape.

As illustrated in FIG. 3, each optical fiber wire 2 includes: a silica glass fiber 4 provided at the center; a resin coating layer 5 of ultraviolet curing resin coating the silica glass fiber 4; markings 6 for identifying the optical fiber tape core wire 1; and a translucent colored layer 7 for distinguishing the optical fiber wires 2A to 2D.

As illustrated in FIG. 3, each marking 6 is printed as a belt-like mark provided on the substantially entire circumference of the resin coating layer 5 with a width W in the longitudinal direction of the optical fiber wire 2. The belt-like markings 6 are provided at regular intervals with a predetermined pitch P in the longitudinal direction of the optical fiber wire. The optical fiber wire is transparent itself, and the colored layer 7 coating the entire resin coating layer 5 including the markings 6 is translucent. Accordingly, the markings 6 provided under the colored layer 7 can be identified through the colored layer 7 as the outermost coating layer. The colored layers 7 of the optical fiber cores 2A to 2D have different colors and function as indices for identifying the individual optical fiber wires 2A to 2D.

In the optical fiber tape core wire 1 of FIG. 1, the markings 6 provided for the optical fiber wires 2A to 2D are located at the same positions in the longitudinal direction of the optical fiber tape core wire. In other words, the markings 6 provided for the optical fiber wires 2A to 2D are aligned at the same positions in the width direction of the optical fiber tape core wire 1. The markings 6 are successively provided at regular intervals of a predetermined pitch P in the longitudinal direction of the optical fiber tape core wire 1.

FIG. 4 illustrates an example in which each optical fiber tape core wire 1 (1A to 1D) is identified by the type of the markings 6 provided for the optical fiber wires 2. In the optical fiber tape core wire 1A of FIG. 4(A), one belt-like marking 6 is consecutively provided at regular intervals of a predetermined pitch in the longitudinal direction of the optical fiber wire. In the optical fiber tape core wire 1B of FIG. 4(B), two markings 6 are consecutively provided at regular intervals of the predetermined pitch in the longitudinal direction of the optical fiber wire. In the optical fiber tape core wire 1C of FIG. 4(C), three markings 6 are consecutively provided at regular intervals of the predetermined pitch in the longitudinal direction of the optical fiber wire. In the optical fiber tape core wire 1D of FIG. 4(D), four markings 6 are consecutively provided at regular intervals of the predetermined pitch in the longitudinal direction of the optical fiber wire.

As described above, the optical fiber tape core wires 1A to 1D include the different patterns of markings 6 as the marks for identifying. The individual optical fiber tape core wires 1A to 1D can be therefore identified visually. Although the markings 6 are coated with the tape forming layers 3, the tape forming layers 3 are made of colorless transparent resin, and the markings 6 can be recognized through the tape forming layers 3. Moreover, when each of the optical fiber tape core wires 1A to 1D is separated and the optical fiber wires 2 having a specific color are extracted from the same, it can be easily recognized by seeing the number of markings 6 on each extracted optical fiber wire 2 which one of the optical fiber tape core wires 1A to 1D the extracted optical fiber wire 2 is associated with. For example, when the separated one optical fiber wire 2 includes three markings 6, it is immediately known that the optical fiber wire 2 is associated with the optical fiber tape core wire 1C.

(Description of Structure of Manufacturing Device for Manufacturing Optical Fiber Tape Core Wire)

Figure 5:
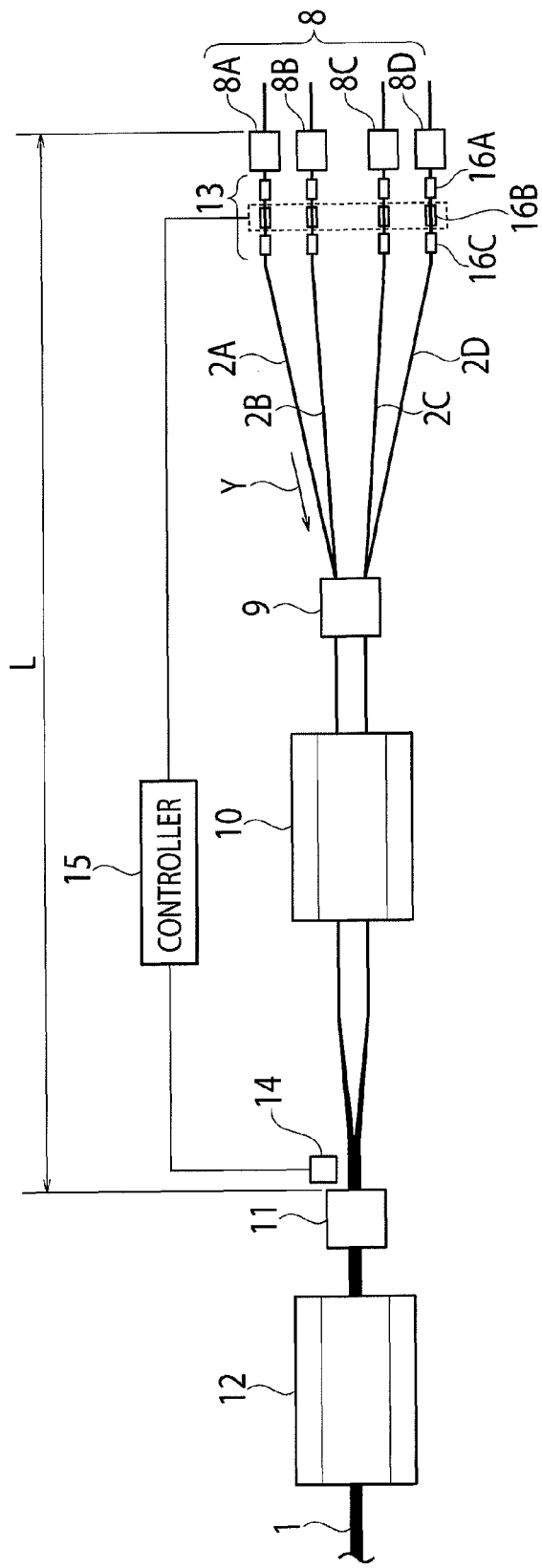
FIG. 5 is a schematic plan view illustrating a manufacturing device for the optical fiber tape core wire of the embodiment.

Next, a description is given of a manufacturing device that manufactures an optical fiber tape core wire according to the present invention. FIG. 5 is a schematic plan view illustrating the manufacturing device that manufactures optical fiber tape core wire according to the embodiment. As illustrated in FIG. 5, the manufacturing device of the embodiment includes printers 8 (8A to 8D), a coloring device 9, a colored layer curing device 10, a tape forming device 11, a tape forming layer curing device 12, and fiber running length adjustment devices 13. The printers 8 print the markings 6 on the plural optical fiber wires 2 (2A to 2D). The coloring device 9 forms the translucent colored layers 7 of different colors in the respective optical fiber wires 2A to 2D with the markings 6 printed thereon. The colored layer curing device 10 cures the colored layers 7. The tape forming device 11 coats the plural optical fiber wires 2A to 2D with colorless transparent resin collectively to form the tape forming layer 3. The tape forming layer curing device 12 cures the tape forming layer 3. The fiber running length adjustment devices 13 adjust the running lengths of the optical fiber wires 2A to 2D running from the respective printers 8 to the tape forming device 11 to a same length.

The manufacturing device further includes a marking position measuring device 14 and a controller 15. The marking position measuring device 14 measures the positions of the markings 6 printed on the optical fiber wires 2A to 2D in just upstream or downstream of the tape forming device 11. The controller 15 calculates the relative positional shift amounts of the measured positions of the markings 6, and based on the calculated relative positional shift amounts, operates the fiber running length adjustment devices 13 that adjust the running lengths of all the optical fiber wires 2 between the respective printers 8 and the tape forming device 11 to a same length.

In the manufacturing device, the printers 8 placed at the right end in FIG. 5 is referred to as a fiber feeding side, and the tape forming layer curing device 12 placed at the left end is referred to as the tape winding side. The optical fiber wires 2 therefore run from the fiber feeding side to the tape winding side in a direction indicated by an arrow Y. The direction of the arrow Y is referred to as a fiber running direction, and the coloring device 9 placed on the tape winding side of the printers 8, which are placed on the fiber feeding side, is defined as an apparatus component located in downstream. On the running path of the optical fiber wires 2, the printers 8, fiber running length adjustment devices 13, coloring device 9, colored layer curing device 10, marking position measuring device 14, tape forming device 11, and tape forming layer curing device 12 are sequentially arranged starting from the fiber feeding side toward the tape winding side.

The manufacturing device of the embodiment further includes: a feeder (not shown) that feeds the optical fiber wires 2 (2A to 2D) to the respective printers 8; and a winder (not shown) that finally winds up the optical fiber tape core wire 1 cured into a tape by the tape forming layer curing device 12.

In the process of manufacturing the optical fiber tape core wire 1, it is necessary to bring the optical fiber wires 2A to 2D in contact with each other or close to each other at a tape forming layer formation step of forming the tape forming layer 3 with the tape forming device 11. This is for the purpose of manufacturing the optical fiber tape core wire 1 as a high-density cable; the purpose of collectively coating the optical fiber wires formed in a tape; and the other purposes. In the case of generally-used optical fiber wires that are coated with ultraviolet curing resin and have a diameter of 250 μm, for example, the distances between adjacent ones of the optical fiber wires are set to about 0 to 125 μm.

On the other hand, at a colored layer formation step of forming the colored layers 7 in the optical fiber wires 2A to 2D with the coloring device 9 and a colored layer curing step of curing the colored layers 7 with the colored layer curing device 10, which are performed before a tape forming layer formation step performed with the tape forming device 11, the arrangement of the optical fiber wires 2A to 2D cannot be in contact with or close to each other because of the following reasons. If the optical fiber wires 2A to 2D are placed in the same arrangement at the colored layer formation step as the tape forming layer formation step, in the case of irradiating ultraviolet rays to the colored layers 7 with the colored layer curing device 10, some portions of the wires are not irradiated by ultraviolet rays, or a particular portion on the circumference of the fiber cross-section is little irradiated with ultraviolet rays, thus resulting in incomplete curing. This could cause identification failures such as uncolored portions and influences on the transmission loss of the optical fibers due to the heterogeneous properties of the attached resin. Accordingly, the distances between adjacent ones of the optical fiber wires 2A to 2D need be wider in the colored layer curing device 10 than those in just upstream of the tape forming device.

Moreover, if the arrangement of the optical fiber wires 2A to 2D at the colored layer formation step is the same as that at the tape forming layer formation step, the optical fiber wires 2A to 2D to which the uncured resin for forming colored layers is attached could be integrated together. This could degrade the function that allows the optical fiber wires 2A to 2D to be individually handled when the tape forming layer 3 is removed, which is one of the effective functions of the optical fiber tape core wires 1. Moreover, if the distances between the optical fiber wires 2A to 2D are as small as 0 to 125 μm, the optical fiber wires 2A to 2D can be brought into contact with one another partially in the longitudinal direction or over the entire length because of shaking of fiber wires due to the mechanical vibrations in the manufacturing process, an influence of electrical charge, and the like.

In a printing step of forming the markings 6 with the printers 8, even if the markings 6 are printed on all the optical fiber wires 2A to 2D at the same position simultaneously, the positions of the markings 6 printed on the optical fiber wires 2A to 2D could be varied by errors of the angles (inclinations) of print heads, the positions of the print heads of the printers 8, and the like.

As described above, at the individual steps of the manufacturing process, the optical fiber wires 2A to 2D need to be arranged at distances suitable for the steps from one another. Accordingly, the running lengths of the optical fiber wires 2A to 2D between the respective printers 8A to 8D and the tape forming device 11 are different from one another. The marking positions of the optical fiber wires 2A to 2D are therefore shifted in the longitudinal direction of the optical fiber tape core wire in just upstream of the tape forming device 11 even if the markings 6 are printed with the printers 8A to 8D on the respective optical fiber wires 2A to 2D at the same time as described above. In order to eliminate such differences, it is necessary to align the position of each marking 6 of the optical fiber wires 2A to 2D with each other in just upstream of the tape forming device 11. As the means for solving the problem, the fiber running length adjustment devices 13 are provided. The configuration of the fiber running length adjustment devices 13 is described later with reference to FIG. 6.

The feeder includes feeding drums on the circumferential surfaces of which the optical fiber wires 2A to 2D are wound. The feeding drums are provided corresponding to the number of optical fiber wires. In this embodiment, four feeding drums are provided for manufacturing the optical fiber tape core wire 1 including the four optical fiber wires 2A to 2D arranged side by side. Each of the optical fiber wires 2A to 2D wound around the circumferential surfaces of the feeding drums has a structure which includes the resin coating layer 5 of resin coating the silica glass fiber 4.

The printers 8A to 8D are independently provided corresponding to the optical fiber wires 2A to 2D, respectively. In the printers 8A to 8D, the above-described belt-like markings 6 are printed partially in the longitudinal direction of the optical fiber wires on the optical fiber wires 2A to 2D which are fed from the feeder and run to the winder. The printers 8 are ink-jet printers, for example, but not limited thereto. Moreover, the printers 8A to 8D are independently used for the respective optical fiber wires 2A to 2D in FIG. 5, but the markings 6 may be printed on the respective optical fiber wires 2A to 2D with a printer composed of a single body.

The coloring device 9 is provided in downstream of the printers 8 in the fiber running direction. The coloring device 9 has a common casing, in which the lucent colored layers 7 of different colors are applied to the respective optical fiber wires 2A to 2D. The coloring material is ultraviolet curing resin. For example, the four optical fiber wires 2A to 2D are colored in blue, white, gray, and yellow. With this coloring device 9, the ultraviolet curing resin is applied as the optical fiber wires 2A to 2D are fed to through-holes which are formed at distances from one another smaller than the distances between the optical fiber wires 2A to 2D when the markings 6 are printed with the printers 8A to 8D.

The colored layer curing device 10 is provided in downstream of the coloring device 9 in the fiber running direction. In the colored layer curing device 10, the ultraviolet curing resin applied by the coloring device 9 is irradiated with ultraviolet rays for curing to form the colored layers 7.

The tape forming device 11 is provided in downstream of the colored layer curing device 10 in the fiber running direction. In the tape forming device 11, the plural optical fiber wires 2A to 2D are coated with colorless transparent resin collectively into a tape, and the tape forming layer 3 is thus formed. In just upstream of the tape forming device 11, the optical fiber wires 2A to 2D coming out from the colored layer curing device 10 are aggregated and reduced in distances therebetween so as to come into contact or close to each other. The colorless transparent resin is ultraviolet curing resin. In the tape forming device 11, the optical fiber wires 2A to 2D arranged side by side in contact with or close to each other run through through-holes, and the resin supplied into the through holes is applied to the optical fiber wires, thus forming the tape forming layer 3.

The tape forming layer curing device 12 is provided in downstream of the tape forming device 11 in the fiber running direction. In the tape forming layer curing device 12, the resin applied by the tape forming device 11 is irradiated with ultraviolet rays for curing, and the tape forming layer 3 is thus completed. By finishing this step, the optical fiber tape core wire 1 of the embodiment illustrated in FIGS. 1 and 2 is obtained.

Figure 6:
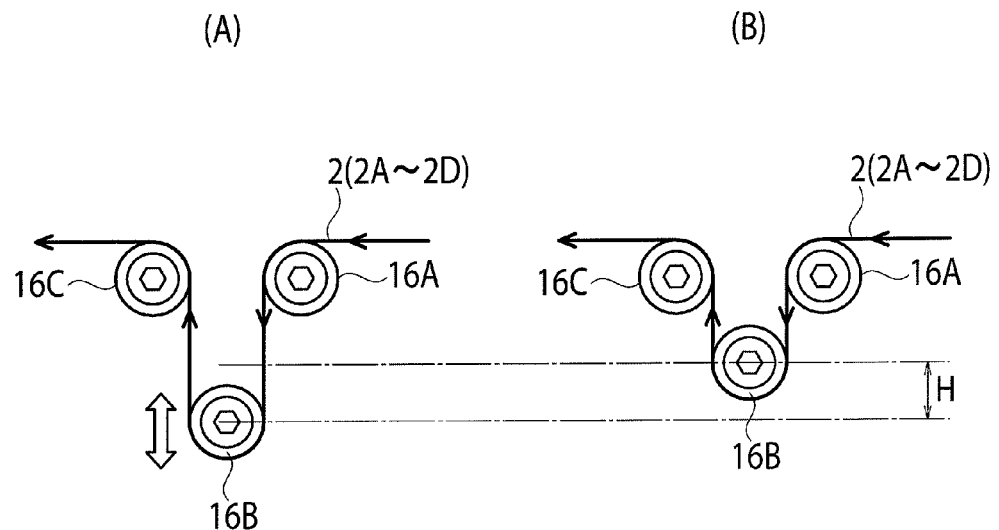
FIG. 6 is side views of a fiber running length adjustment device of the manufacturing device of FIG. 5, FIG. 6(A) being an example in which the running length of the optical fiber running from a printer to a tape forming device is increased, FIG. 6(B) being an example in which the running length of the optical fiber running from the printer to the tape forming device is reduced.

The fiber running length adjustment devices 13 are provided between the printers 8 and coloring device 9. As illustrated in FIG. 6, each fiber running length adjustment device 13 includes three rollers 16A, 16B, and 16C arranged in the running direction of the optical fiber wires 2A to 2D. The fiber running length adjustment device 13 has a structure in which the central roller 16B is moved close to or away from the other two rollers 16A and 16C to change height H of the roller 16B with respect to the two rollers 16A and 16C. For example, the running length of each optical fiber wire 2A to 2D is increased when the central roller 16B is moved away from the two rollers 16A and 16B fixed to the base to increase the height H as illustrated in FIG. 6(A). On the other hand, the running length of each optical fiber wire 2A to 2D is shortened when the central roller 16B is moved close to the two rollers 16A and 16B to reduce the height H as illustrated in FIG. 6(B). The fiber running length adjustment devices 13 are provided corresponding to the respective optical fiber wires 2A to 2D.

The marking position measuring device 14 is provided in just next to the tape forming device 11 between the colored layer curing device 10 and tape forming device 11. The marking position measuring device 14 detects and quantifies the positions of the markings 6 printed on the optical fiber wires 2A to 2D with an image sensor. The marking position measuring device 14 may be arranged in just downstream of the tape forming device 11.

The controller 15 operates the fiber running length adjustment devices 13 based on the relative positional shift amounts of the marking positions of the optical fiber wires 2A to 2D which are measured with the marking position measuring device 14 so that the running lengths of all the optical fiber wires 2A to 2D between the respective printers 8 and tape forming device 11 are adjusted to a same length. Specifically, when the positions of the markings 6 provided for the four optical fiber wires 2A to 2D are not aligned, the controller 15 adjusts the height H of the central rollers 16A to 16C of the fiber running length adjustment devices 13 corresponding to ones of the optical fiber wires 2A to 2D whose markings 6 are shifted so that the running lengths of the optical fiber wires 2A to 2D between the printers 8 and the tape forming device 11 equal to each other. The controller 15 can adjust the height position of the roller 16B with a high accuracy by freely driving the central roller 16B with a stepping motor.

(Description of Manufacturing Method of Optical Fiber Tape Core Wire)

Next, a description is given of a method of manufacturing the optical fiber tape core wire of the embodiment. The manufacturing method of the embodiment includes: a printing step of printing the markings 6 for identifying optical fiber tape core wires on the optical fiber wires 2 with the printers 8 (8A to 8D) provided in the middle of the running path of the optical fiber wires 2 (2A to 2D); a colored layer forming step of forming the translucent colored layers 7 of different colors on the respective optical fiber wires; a colored layer curing step of curing the colored layers 7 with the colored layer curing device 10; a tape forming layer formation step of forming the tape forming layer 3 by coating the plural optical fiber wires 2 with colorless transparent resin collectively into a tape with the tape forming device 11; a tape forming layer curing step of curing the tape forming layer 3 with the tape forming layer curing device 12; a fiber running length adjustment step of adjusting the running lengths of all the optical fiber wires 2 between the respective printers 8 and the tape forming device 11 to a same length with the fiber running length adjustment devices 13 that adjust the running lengths of the optical fiber wires 2 running from the respective printers 8 to the tape forming device 11; and a fiber running length correction step of measuring the positions of the markings 6 printed on each optical fiber wire in just upstream or downstream of the tape forming device 11, calculating the relative positional shift amount of the measured position of each marking, and based on the calculated relative positional shift amounts, operating the fiber running length adjustment devices 13 to adjust the running lengths of all the optical fiber wires 2 between the respective printers 8 and tape forming device 11 to a same length.

Figure 7:
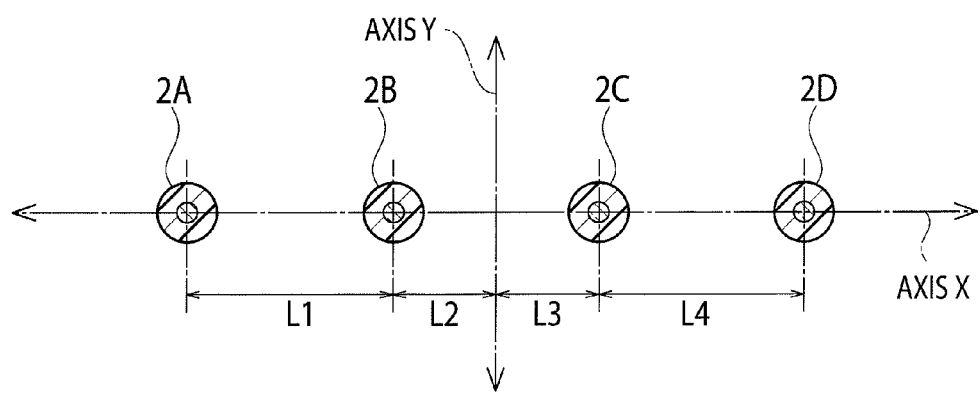
FIG. 7 is a view illustrating an arrangement of optical fiber wires in just upstream of the printer.

Hereinafter, the steps of the method of manufacturing the optical fiber tape core wire 1 are specifically described in the order of the steps thereof. First, the optical fiber wires 2 (2A to 2D) are fed from the feeding drums. The fed optical fiber wires 2 are fed to the corresponding printers 8 (8A to 8D). As illustrated in FIG. 7, the distances between the optical fiber wires 2A to 2D are wide in the printers 8. For example, the four optical fiber wires 2A to 2D are arranged side by side, and distances L1 to L4 adjacent to one another between the optical fiber wire 2A at the left end in FIG. 7 and the optical fiber wire 2D at the right end are set to 50, 25, 25, and 50 mm, respectively.

In the printing step, the translucent markings 6 of different colors are printed and formed in the respective optical fiber wires 2A to 2D with the printers 8 (8A to 8D) placed at the same position. As illustrated in FIG. 3, each marking 6 is printed as a belt-like mark in part of each optical fiber wire in the longitudinal direction thereof. The belt-like markings 6 are provided consecutively at regular intervals with a predetermined pitch P in the longitudinal direction of the optical fiber wires.

Figure 8:
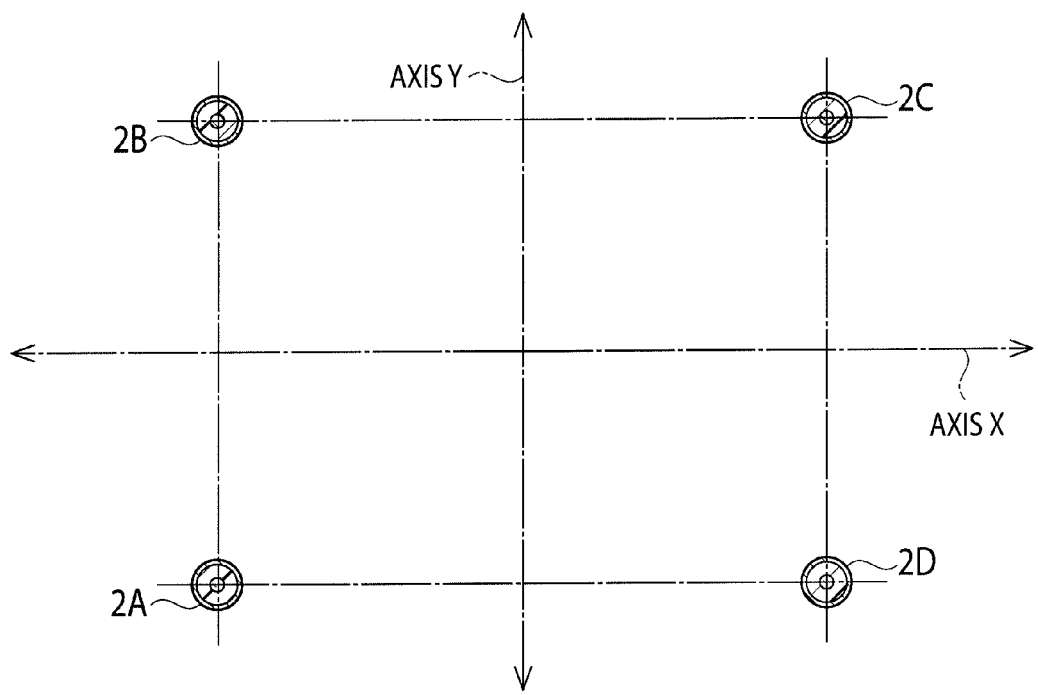
FIG. 8 is a view illustrating an arrangement of optical fiber wires in just upstream of a coloring device.

When the markings 6 are formed in the respective fiber wires 2A to 2D, the optical fiber wires 2A to 2D are fed to the coloring device 9, in which the coloring step is performed. Just before the coloring step, the optical fiber wires 2A to 2D are arranged at four corners of a square as illustrated in FIG. 8. For example, when two orthogonal lines passing through the center of the square are defined as axes X and Y, the distance between the optical fiber wires 2A to 2D in the axes X and Y are 10 mm, respectively.

In the coloring step, the translucent colored layers 7 of different colors are formed continuously in the longitudinal direction in the respective optical fiber wires 2A to 2D arranged as illustrated in FIG. 8. The coloring material is ultraviolet curing resin. The four optical fiber wires 2A to 2D are colored in blue, white, yellow, and gray, for example.

After the coloring layers 7 are formed in the optical fiber wires 2A to 2D, the optical fiber wires 2A to 2D are fed to the colored layer curing device 10, in which the colored layer curing step is performed. In the colored layer curing step, the optical fiber wires 2A to 2D are irradiated with ultraviolet rays to cure the applied but uncured ultraviolet curing resin. In such a manner, the cured colored layers 7 are formed as illustrated in FIG. 3 in the respective optical fiber wires 2A to 2D.

Figure 9:
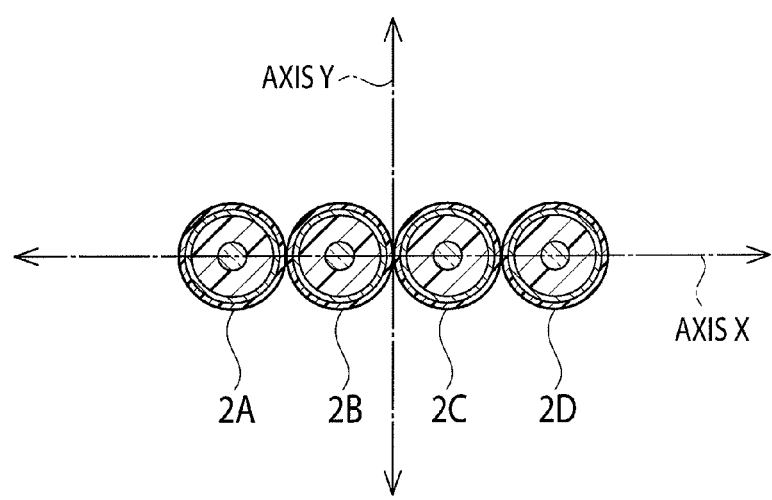
FIG. 9 is a view illustrating an arrangement of optical fiber wires in just upstream of the tape forming device.

After the ultraviolet curing resin applied to the optical fiber wires 2A to 2D are cured to form the colored layers 7, the optical fiber wires 2A to 2D are collected so as to be close to one another. For example, in just upstream of the tape forming device 11, the optical fiber wires 2A to 2D are arranged in contact with one another on the axis X where the axes X and Y are two lines orthogonal to each other as illustrated in FIG. 9. After being collected and arranged side by side, the optical fiber wires 2A to 2D are fed to the tape forming device 11, in which the tape forming layer formation step is performed.

In the tape forming layer formation step, the optical fiber wires 2A to 2D arranged as illustrated in FIG. 8 are coated with colorless transparent resin collectively into a tape with the tape forming device 11. The colorless transparent resin is ultraviolet curing resin. In the tape forming device 11, the ultraviolet curing resin is continuously applied in the longitudinal direction to the optical fiber wires 4A to 4D arranged side by side in contact with one another.

After the tape forming layer 3 is formed, the optical fiber wires 2A to 2D formed into a tape are fed to the tape forming layer curing device 12, in which the tape forming layer curing step is performed. In the tape forming layer curing step, the resin applied with the tape forming device 11 is irradiated by ultraviolet rays and cured to complete the tape forming layer 3. In such a manner, the optical fiber tape core wire 1 illustrated in FIGS. 1 and 2 is manufactured.

Figure 10:
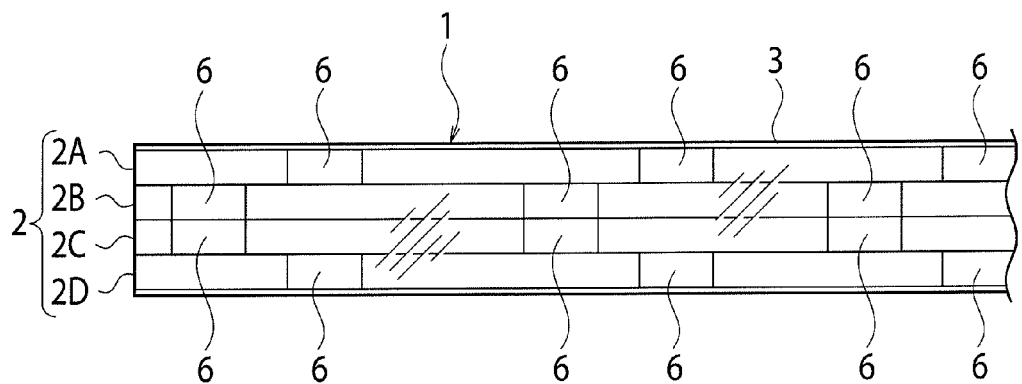
FIG. 10 is a plan view of an optical fiber tape core wire illustrating an example in which the markings printed on the optical fiber wires are misaligned because adjustment of the fiber running lengths is not performed.

As illustrated in FIG. 10, for example, if the positions of the markings 6 are not aligned at the same positions as illustrated in FIG. 1, the fiber running length adjustment step of adjusting the running lengths of all the optical fiber wires 2A to 2D between the respective printers 8A to 8D and tape forming device 11 to a same length with the fiber running length adjustment device 13. In the fiber running length adjustment step, the central roller 16B constituting each fiber running length adjustment device 13 corresponding to each optical fiber wire 2A to 2D is moved close to or away from the rollers 16A and 16C as illustrated in FIG. 6 to change the relative height H of the roller 16B with respect to the rollers 16A and 16C. This can increase or reduce the running length of each optical fiber wire 2A to 2D running from the corresponding printer 8 to the tape forming device 11.

In the fiber running length adjustment step, the positions of the markings 6 printed on each optical fiber wire 2A to 2D are measured with the marking position measuring device 14 in just upstream or downstream of the tape forming device 11. The relative positional shift amount of the measured position of each marking 6 is calculated with the controller 15. The controller 15 operates the fiber running length adjustment device 13 and adjusts the height positions of the central rollers 16B based on the calculated relative positional shift amounts so that the running lengths of all the optical fiber wires 2A to 2D between the respective printers 8 and the tape forming device 11 are adjusted to a same length. For example, when the positions of the markings 6 provided for the central two optical fiber wires 2B and 2C among the four optical fiber wires 2A to 2D are different from the positions of the corresponding markings 6 provided for the two optical fiber wires 2A and 2D on both sides, the central rollers 16B of the fiber running length adjustment devices 13 provided corresponding to the optical fiber wires 2B and 2C, whose markings 6 are shifted, are raised so that the running lengths of all the optical fiber wires 2A to 2D between the respective printers 8 and the tape forming device 11 are set to a same length.

The optical fiber tape core wire 1 illustrated in FIGS. 1 and 2 was actually manufactured with the manufacturing device illustrated in FIG. 5. In the four optical fiber wires 2A to 2D arranged side by side, the optical fiber wire 2A at an end is called No. 1, the optical fiber wire 2B next thereto is called No. 2, the optical fiber wire 2C next thereto is called No. 3, and the farthest optical fiber wire 2D is called No. 4. The running lengths of the optical fiber wires 2A to 2D were then calculated. Herein, the distance between the position in just upstream of the printers 8 and the position in just upstream of the entrance of the tape forming device 11 is indicated by L as illustrated in FIG. 5. The calculated values of the running lengths of No. 1 and No. 4 optical fibers 2A and 2D were 5108.2 mm, and those of No. 2 and No. 3 optical fiber wires 2B and 2C were 5100.8 mm.

In the optical fiber tape core wire 1 actually produced, the positions of the markings 6 of the No. 2 and No. 3 optical fiber wires 2B and 2C were +7 mm with respect to the No. 1 optical fiber wire 2A, and the positions of the markings 6 of the No. 4 optical fiber wire 2D were +0.1 mm. Moreover, the shift amounts of the markings 6 substantially correspond to the calculated values of the running lengths thereof. The height of the central roller 16B of the fiber running length adjustment device 13 was adjusted based on the shift amount of each marking 6. Herein, the heights of the central rollers 16B of the fiber running length adjustment devices 13 corresponding to the No. 2 and No. 3 optical fiber wires 2B and 2C were set 3.5 mm below the heights of the central rollers 16B of the fiber running length adjustment devices corresponding to the No. 1 and No. 4 optical fiber wires 2A and 2D. As a result, the markings 6 formed in the No. 2 optical fiber wire 2B were located at +0.2 mm with respect to the No. 1 optical fiber wire 2A, the markings 6 formed in the No. 3 optical fiber wire 2C were located at +0.1 mm, and the markings 6 formed in the No. 4 optical fiber wire 2D were located at +0.1 mm. Accordingly, the markings 6 formed in the optical fiber wires 2A to 2D can be provided at the same positions.

(Description of Structure of Optical Fiber Cable)

Figure 11:
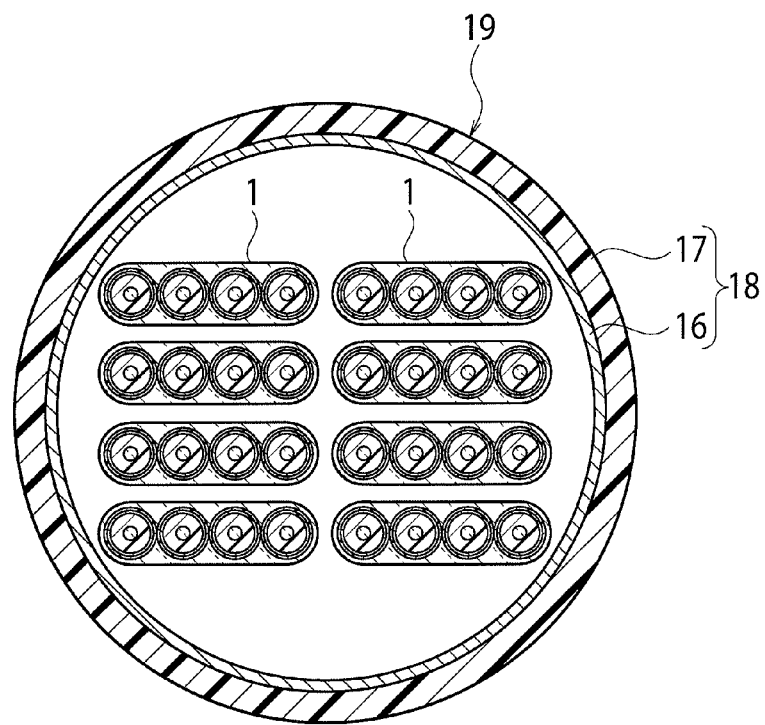
FIG. 11 is a cross-sectional view illustrating an example of an optical fiber cable accommodating the optical fiber tape core wires manufactured by the method of the invention.

The optical fiber tape core wire 1 manufactured by the manufacturing method of the present invention has a cable structure in which an aggregate of plural optical fiber tape core wires 1 is covered with a sheath 18 which includes a tube 16 and a jacket 17 as illustrated in FIG. 11, for example. The tube 16 is formed by extruding thermosetting resin around the aggregate. The outer circumference of the extruded tube 16 is covered with the outer jacket 17 made of polyethylene or the like. The optical fiber cable 19 of FIG. 11 has a so-called center tube-type optical fiber cable structure in which plural optical fiber tape core wires 1 are accommodated in the center of the cable, that is, the sheath 18. In this example, the optical fiber cable 19 is a center tube-type optical fiber cable, but the cable structure accommodating the optical fiber tape core wires 1 manufactured by the manufacturing method of the present invention may be any type.

For example, in the optical fiber cable 19 illustrated in FIG. 11, in the case of splitting the sheath 18 and extracting a specific wire 1 from the plural optical fiber tape core wires 1 accommodated therein, the specific optical fiber tape core wire 1 can be easily found out since the types of the markings 6 can be identified through the colorless transparent tape forming layers 3. After the specific optical fiber tape core wire 1 is extracted from the sheath 18, it can be recognized which optical fiber tape core wire 1 the separated optical fiber wire 2 is associated with by separating one of the optical fiber wires 2 from the specific optical fiber tape core wire 1 and seeing the markings 6 of the separated optical fiber wire 2.

Effects of Embodiment

According to the embodiment, the running lengths of all the optical fiber wires between the respective printers and tape forming device are adjusted to a same length at the fiber running length adjustment step with the fiber running length adjustment devices which adjust the running lengths of the optical fiber wires running between the respective printers and tape forming device. Accordingly, the positions of the markings printed on each optical fiber wire can be aligned with the positions of the corresponding markings of the other optical fiber wires at the same positions in the longitudinal direction of thereof in just upstream of the tape forming device. When the optical fiber wires are then aggregated into a tape in the tape forming layer formation step, the optical fiber tape core wire in which the positions of all the markings of the optical fiber wires are aligned can be manufactured. Even when the optical fiber tape core wire is separated into optical fiber wires, it can be easily recognized which optical fiber tape core wire each separated optical fiber wire is associated with only by seeing the type of the markings thereof.

According to the embodiment, moreover, by performing the fiber running length correction step, the running lengths of all the optical fibers between the respective printers and tape forming device can be set to a same length based on the relative positional shift amount of the measured position of each marking.

According to the embodiment, moreover, by providing the fiber running length adjustment devices, even when the positions of the markings formed on the optical fiber wires are misaligned, for example, the positions of all the markings of each optical fiber wire can be set to the same positions according to the shift amounts.

According to the embodiment, moreover, the manufacturing device includes the marking position measuring device and controller, and the controller operates the fiber running length adjustment devices based on the relative positional shift amounts of the positions of the markings of each optical fiber wire calculated by the marking position measuring device. Accordingly, the running lengths of all the optical fiber wires between the respective printers and tape formation device can be set equal to one another.

According to the embodiment, moreover, even if the tape forming layer is removed from each optical fiber tape core wire manufactured by the manufacturing method of the present invention, it can be visually identified easily which optical fiber tape core wire each optical fiber wire is associated with by seeing the markings printed on the optical fiber wire.

According to the embodiment, moreover, in the case of an optical fiber cable accommodating the plural optical fiber tape core wires manufactured by the manufacturing method of the present invention, in the process of extracting a specific optical fiber tape core wire from the cable, the optical fiber tape core wire to be extracted can be visually identified easily by seeing the type of the markings. Moreover, even if the extracted optical fiber tape core wire is separated into optical fiber wires, it can be visually identified immediately which optical fiber tape core wire each separated optical fiber wire is associated with by seeing the markings of the optical fiber wire.

Other Embodiments

Figure 12:
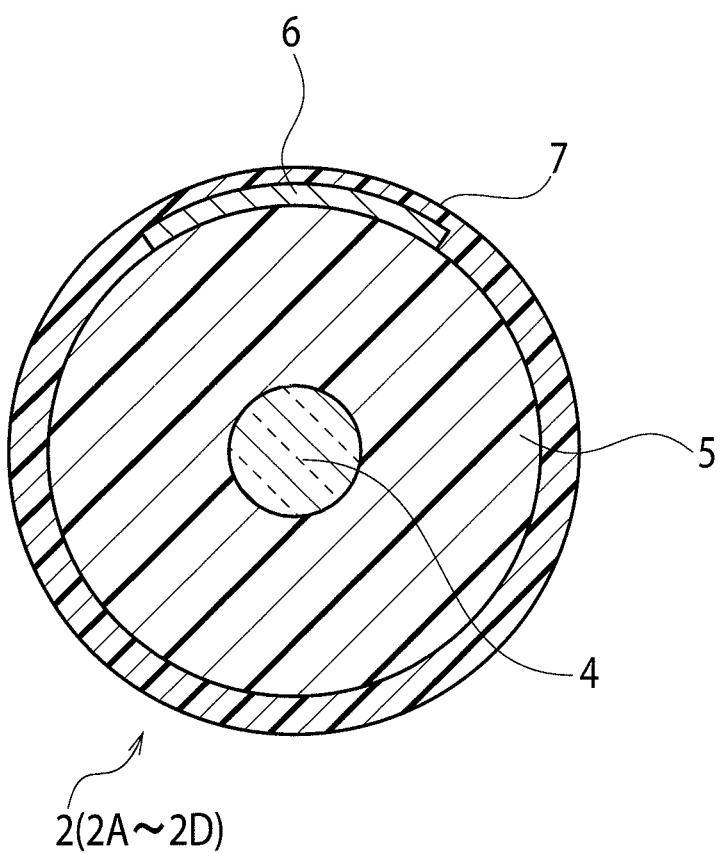
FIG. 12 is an enlarged cross-sectional view of an optical fiber illustrating another marking form.

In FIG. 3 described above, each marking 6 is printed as a belt-like mark around the substantially entire circumference of the resin coating layer 5. However, each marking 6 may be provided on a part of the circumference of the resin coating layer 5 as illustrated in FIG. 12. This can provide the same operational effects as those of the above-described embodiment. The length of the marking 6 is preferably not less than about ⅙ of the circumferential length of the resin coating layer 5, which is the same as the diameter of the silica glass fiber 4. By setting the length of the marking 6 not less than about ⅙, the markings 6 can be easily recognized visually. For clearly showing the partially provided marking 6, the marking 6 in FIG. 12 does not have the same size as the diameter of the silica glass fiber 4.

INDUSTRIAL APPLICABILITY

The present invention is applicable to a method of manufacturing an optical fiber tape core wire in which even when the optical fiber tape core wire is separated into optical fiber wires, it can be determined which optical fiber tape core wire each optical fiber wire is associated with.

What is claimed is:

1. A method of manufacturing an optical fiber tape core wire, comprising:
    a printing step of causing a plurality of optical fiber wires to run, each optical fiber wire including a resin coating layer of resin coating a silica glass fiber, and using a printer provided in a middle of a path of running, to print a marking for identifying the optical fiber tape core wire on a part of each of the plurality of optical fiber wires in the longitudinal direction;
    a colored layer formation step of using a coloring device provided in downstream of the printer in a fiber running direction to form translucent colored layers of different colors on the respective optical fiber wires with the markings printed in the printing step;
    a colored layer curing step of using a colored layer curing device provided in downstream of the coloring device in the fiber running direction to cure the colored layer;
    a tape forming layer formation step of using a tape forming device provided in downstream of the colored layer curing device in the fiber running direction to coat the plurality of optical fiber wires with colorless transparent resin collectively into a tape and form a tape forming layer;
    a tape forming layer curing step of using a tape forming layer curing device provided in downstream of the tape forming device in the fiber running direction to cure the tape forming layer; and
    a fiber running length adjustment step of using fiber running length adjustment devices adjusting the running lengths of the plurality of optical fiber wires running from the respective printers to the tape forming device to adjust the running lengths of all the optical fiber wires between the respective printers and tape forming device to a same length.

2. The method of manufacturing an optical fiber tape core wire according to claim 1, further comprising:
    a fiber running length correction step of measuring the position of the marking printed on each optical fiber wire in just upstream or downstream of the tape forming device, calculating a relative positional shift amount of the measured position of each marking, and based on the relative positional shift amounts, operating the fiber running length adjustment devices to adjust the running lengths of all the optical fiber wires between the respective printers and the tape forming device to a same length.

3. A manufacturing device for an optical fiber tape core wire, comprising:
    a printer which causes a plurality of optical fiber wires to run, each optical fiber wire including a resin coating layer of resin coating a silica glass fiber, to print a marking for identifying an optical fiber tape core wire on a part of each of the plurality of optical fiber wires in the longitudinal direction in a middle of a path of running;
    a coloring device which forms translucent colored layers of different colors on the respective optical fiber wires with the markings printed;
    a colored layer curing device which cures the colored layer;
    a tape forming device which coats the plurality of optical fiber wires with colorless transparent resin all collectively a tape to form a tape forming layer;
    a tape forming layer curing device which cures the tape forming layer; and
    fiber running length adjustment devices which adjust the running lengths of the plurality of optical fiber wires running from the respective printers to the tape forming device to a same length.

4. The manufacturing device for an optical fiber tape core wire according to claim 3, further comprising:
    a marking position measuring device which measures the position of the marking printed on each optical fiber wire in just upstream or downstream of the tape forming device; and
    a controller which calculates a relative positional shift amount of the measured position of each marking, and based on the relative positional shift amounts, operates the fiber running length adjustment devices to adjust the running lengths of all the optical fiber wires between the respective printers and the tape forming device to a same length.

5. An optical fiber tape core wire, wherein the optical fiber tape core wire is manufactured by the manufacturing method according to claim 1.

6. An optical fiber cable, comprising: a plurality of the optical fiber tape core wires according to claim 5 accommodated in the cable.

* * * * *